L. COATES.
Variable Measure.

No. 59,186. Patented Oct. 30, 1866.

Witnesses

Inventor

UNITED STATES PATENT OFFICE.

LEWIS COATES, OF COLLAMER, PENNSYLVANIA.

IMPROVEMENT IN VARIABLE MEASURES.

Specification forming part of Letters Patent No. 59,186, dated October 30, 1866.

*To all whom it may concern:*

Be it known that I, LEWIS COATES, of Collamer, in the county of Chester and State of Pennsylvania, have invented a new and useful Improvement in Measures; and I do hereby declare that the following is a full, clear, and exact description thereof, which will enable those skilled in the art to make and use the same, reference being had to the accompanying drawings, forming part of this specification, in which—

Figure 1:
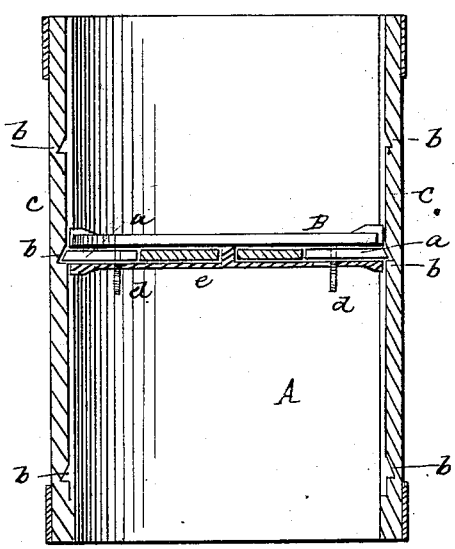
Figure 2:
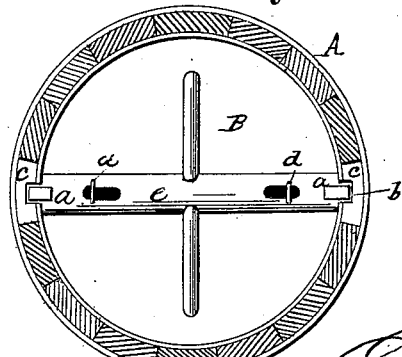

Figure 1 represents a vertical central section of this invention. Fig. 2 is an inverted sectional plan of the same.

Similar letters of reference indicate corresponding parts.

This invention relates to a measure with a shifting bottom, which is provided with suitable catches or fastenings at its under side, in such a manner that by raising or lowering said bottom the measure can be adjusted for different quantities, such as a peck, a bushel, a coomb, or any other desirable quantity, and that one and the same measure can be used for various quantities. The bottom is adjusted according to the desired quantity to be measured by notched staves, which receive the spring catches or fastenings and retain said bottom in the desired position.

A represents a cylindrical vessel, which is made of wood or any other suitable material, open at both ends, and of any desirable diameter and height. Into this cylinder is fitted a bottom, B, which can be moved up and down, and which is provided at its under surface with spring-catches $a$, which drop into notches $b$ and retain the bottom in any desired position. The notches $b$ are made in metallic staves $c$, which are fitted in between the wooden staves composing the cylinder A, and said notches are at such distances apart that when the bottom is secured in the first or upper notches the measure corresponds, for instance, to a peck; when the bottom is shifted to the second set of notches the measure corresponds to two pecks, or half a bushel; and when the bottom is moved down to the bottom notches the measure corresponds to a bushel. It is obvious, however, that the notches and the measure itself can be adapted for any other desired quantity.

The spring-catches $a$ move in a suitable tubular case, $e$, secured to the under surface of the bottom, and they are operated by suitable handles $d$. It is obvious, however, that fastenings of different description may be used to secure the bottom B in the desired position, and I do not wish to confine myself to the precise form shown in the drawings.

What I claim as new, and desire to secure by Letters Patent, is—

The notched staves $c$ and catches $a$, in combination with the movable bottom B and measure A, constructed and operating substantially as and for the purpose described.

LEWIS COATES.

Witnesses:
THOS. H. RICHEY,
WM. H. GAY.